United States Patent [19]

Hayashi et al.

[11] Patent Number: 5,434,626
[45] Date of Patent: Jul. 18, 1995

[54] DISPLAY APPARATUS DISPLAYING OPERATION MENU

[75] Inventors: Toshihide Hayashi, Kanagawa; Koki Tsumori, Tokyo, both of Japan

[73] Assignee: Sony Corporation, Tokyo, Japan

[21] Appl. No.: 252,972

[22] Filed: Jun. 2, 1994

Related U.S. Application Data

[63] Continuation of Ser. No. 942,775, Sep. 10, 1992, abandoned.

[30] Foreign Application Priority Data

Sep. 10, 1991 [JP] Japan ................................. 3-230361
Sep. 10, 1991 [JP] Japan ................................. 3-258581
Sep. 10, 1991 [JP] Japan ................................. 3-258582

[51] Int. Cl.[6] ................................................ H04N 5/44
[52] U.S. Cl. ................................. 348/569; 348/565; 348/734
[58] Field of Search .............. H04N 5/45, 5/44, 9/74; 348/563, 564, 565, 569, 570, 734, 733, 732, 731

[56] References Cited

U.S. PATENT DOCUMENTS

| | | | |
|---|---|---|---|
| 4,620,229 | 10/1986 | Amano et al. | 358/194.1 |
| 4,729,027 | 3/1988 | Hakamada et al. | 358/183 |
| 4,754,268 | 6/1988 | Mori | 340/710 |
| 4,989,081 | 1/1991 | Miyagawa et al. | 358/93 |
| 5,075,766 | 12/1991 | Sendelweck | 358/22 |
| 5,091,785 | 2/1992 | Canfield et al. | 358/183 |
| 5,130,803 | 7/1992 | Kurita et al. | 358/191.1 |
| 5,146,210 | 9/1992 | Heberle | 340/709 |
| 5,173,778 | 12/1992 | Sasaki et al. | 358/188 |
| 5,212,553 | 5/1993 | Maruoka | 358/188 |

FOREIGN PATENT DOCUMENTS 4077109  3/1992  Japan ............................ H04N 5/45
2155714  9/1985  United Kingdom .

OTHER PUBLICATIONS

B. Myers, "Window Interfaces: A Taxonomy of Window Manager User Interfaces", IEEE Computer Graphics and Applications, vol. 8, No. 5, Sep. 1988, 81.
Patent Abstracts of Japan, vol. 15, No. 273, Jul. 11, 1991 (Hiroko et al.).
Patent Abstracts of Japan, vol. 11, No. 195, Jun. 23, 1987 (Kawashima).

*Primary Examiner*—Victor R. Kostak
*Assistant Examiner*—Nathan J. Flynn
*Attorney, Agent, or Firm*—Jay H. Maioli

[57] ABSTRACT

A television receiver has a system controller and a memory that supplies data to a display microcomputer for displaying a menu of features, such as picture-in-picture, a broadcast satellite receive mode, a reservation of recording mode. The displaying microcomputer displays the menu on a sub-screen portion of a cathode-ray tube. A user selects a feature using a remote controller and the system controller displays cursor that moves under user control, and displays non-selected items in half-tone brightness or a different color.

34 Claims, 15 Drawing Sheets

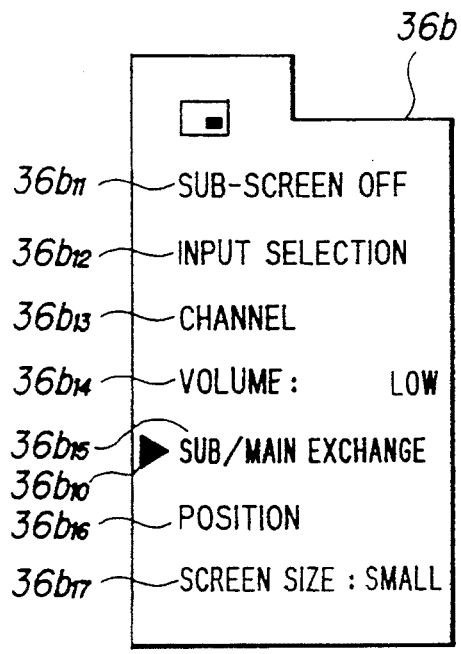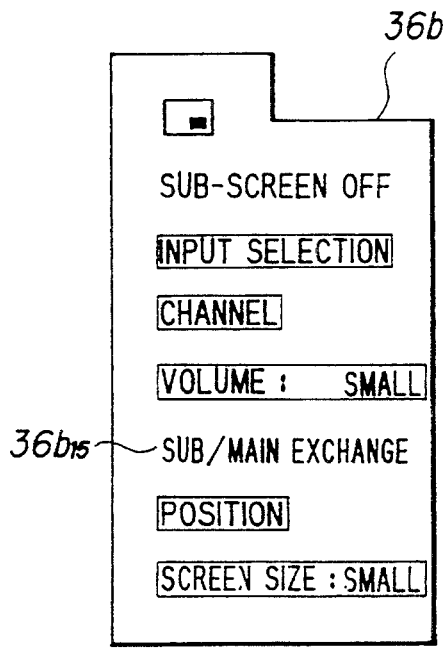
FIG.6a  FIG.6b
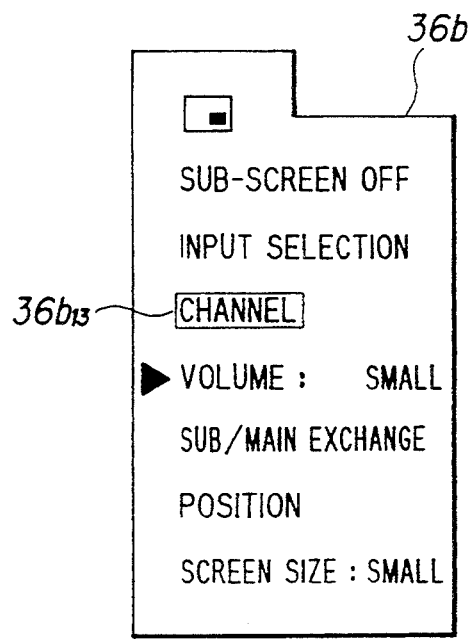
FIG.6c

FIG.13

```
                        m2' CURRENTLY-EXECUTED ITEM
                       /
  No.    START         CH
                      /
  1  MON. PM 7:00    1     ⎫
                           ⎪
  2  TUE  AM 6:00    4     ⎬  m2 ITEM
  :   :     :        :     ⎪
  n  FRI. AM 3:00    BS3   ⎭
```

DISPLAY APPARATUS DISPLAYING OPERATION MENU

This is a continuation of application Ser. No. 07/942,775, filed Sep. 10, 1992, now abandoned.

BACKGROUND OF THE INVENTION

1. Field of the Invention

This invention relates generally to controlling a television receiver with a remote commander and, specifically, to controlling a television having the picture-in-picture feature.

2. Description of the Background

Recently television receivers are equipped with various functions, such as the so-called picture-in-picture function and the ability to preset a TV channel program for viewing or recording. In the picture-in-picture function, the overall area of the screen is selected as a main screen, and a portion of this main screen is selected as a sub-screen on which pictures or images of another TV channel are displayed. Recent television receivers also include a built-in satellite broadcasting tuner to receive satellite broadcasting programs.

In addition, a recent television receiver has been proposed in which, after a mechanical switch is switched on to place it into a standby state, the main power to the receiver can be switched on or off by a remote controller. When the main power is switched on, each of the tuners for the VHF/UHF and the satellite broadcast is supplied with power and carries out its receiving and transmitting operations. On the other hand, when the main power is switched off, the supply of the power to each of the tuners for VHF/UHF and for the satellite broadcast is de-energized, and the receiving and transmitting operations thereof are stopped.

The television receiver described above also enables a desired reserved program to be received at a desired reserved time, and also can perform various settings such as a color adjustment setting, a volume adjustment setting, and the like by manipulation of a remote controller. Desired ones of the above items are displayed on the screen of the cathode-ray tube of the television receiver, and then parameters for the displayed items are set.

Also in a recent television receiver, various functions are improved by displaying the contents of operations, the operation sequences, and the receiving conditions for various functions in displays called menus. These menus are displayed on the sub-screen, for example, in order to simply utilization of these functions by a user. An attempt is made to improve the man-to-machine interface function.

When the operation of the menu display is performed by a user, the setting items with regard to the plural functions provided by the television receiver are first displayed on the sub-screen. A selection is then made of one of these plural setting items by employing a cursor moved by operation of the remote controller. The new setting items, for example, the contents of the operation and sequence of operations, are displayed. Next, when the user wants to register a recording reservation of a desired TV program for example, the recording start and stop times and the channel number are set by the user.

To confirm the contents of the setting items selected by the user, when one of the plural setting items is selected, the color of this selected item is changed, blanked, and highlighted. Nevertheless, the color changing, blanking, and highlighting of these known television receivers does not make it easy for the user to confirm the selected operations.

Another proposed television apparatus displays only selected items without other setting items, but it is nevertheless necessary for the receiver to prepare an image for displaying all items in order to display only selected items. This results in the drawback that a large amount of memory capacity is needed for displaying a menu.

Simplification of operation of recent television receivers is also desired. One proposal for such simplification, is to display a sequence of a menu on the screen, select the desired item by a moving cursor, and display the selected item for parameter setting. But in this menu setting method, particularly when moving the cursor on the screen by a remote controller, the cursor is frequently moved incorrectly, because of differences in the timing of transmission of operation data from the remote controller to the television and the timing of the scanning screen of the menu. Moreover, when the reserving operation is performed, if the user performs another operation, there is the possibility of mistake, for example, the undesired deletion of a parameter.

OBJECT AND SUMMARY OF THE INVENTION

Accordingly, it is an object of the present invention to provide a television receiver that overcomes the above drawbacks inherent in previously proposed receivers.

According to one aspect of the present invention, a television receiver can support many features without losing ease of operation, and provides a very easy-to-see-display. For example, the menu is in common with many items of operations and only a small amount of memory capacity is needed. It then becomes easy to select an item by moving the cursor, and it is easy for the user to recognize which item is selected and operated correctly, and to prevent mistakes in erroneously changing parameters.

The above and other objects, features, and advantages of the present invention will become apparent from the following detailed description of illustrative embodiments thereof, to be read in connection with the accompanying drawings, in which like reference numerals represent the same or similar elements.

BRIEF DESCRIPTION OF THE DRAWINGS

FIG. 6 consists of views of other menu displays on a screen of the television and showing half-tones and a cursor;

FIG. 13 is a view of a display operation for reserving or confirming timer operation and recording;

DETAILED DESCRIPTION OF PREFERRED EMBODIMENTS

Figure 1:
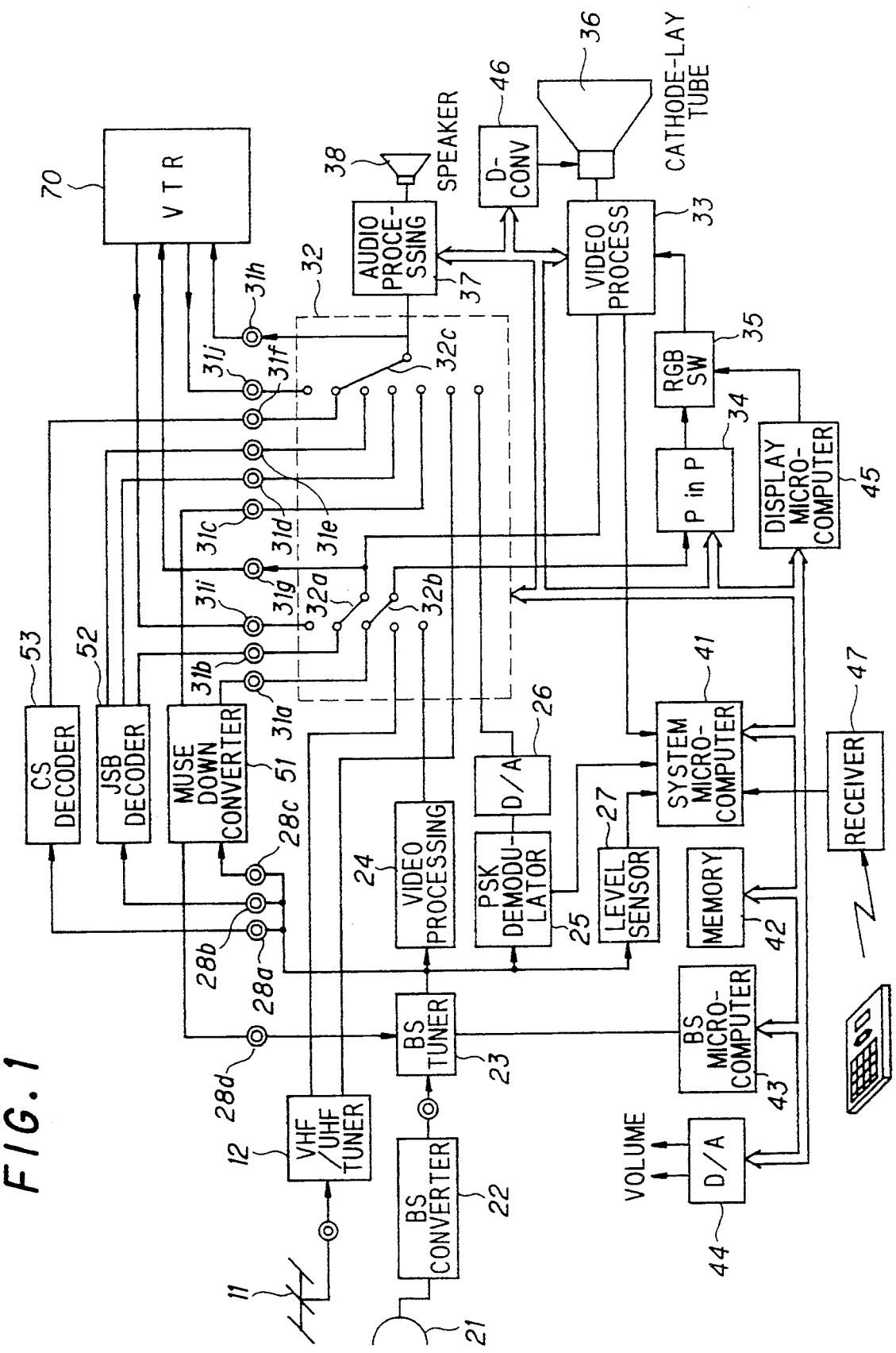
FIG. 1 is a block diagram of a television receiver comprising a VHF/UHF tuner, a BS tuner, a signal selector, and a controller formed by a microcomputer according to an embodiment of the present invention.

FIG. 1 is a block diagram of a television receiver according to an embodiment of this invention including a VHF/UHF receiving section for receiving NTSC color television signals and sound signals, and a receiving section for receiving signals from a broadcast satellite (BS) or from a communication satellite (CS). A control section controls and selects signals and a sound section reproduces the sound at a loudspeaker.

In the VHF/UHF receiver 12, to which a Yagi antenna 11 is connected, the desired channel from the VHF/UHF band is selected and the color video signal and audio sound signal are produced.

The satellite broadcast receiver is connected to a parabola antenna 21 that receives the 12 GHz signal broadcast by the satellite, and the received signal is converted in frequency to a 1 GHZ signal using a BS converter 22. The converted signal is fed to a broadcast satellite tuner 23 that selects the desired channel, performs automatic gain control (AGC), IF amplitude, FM demodulation, de-emphasis, and reduction of an energy dispersal signal. The BS tuner 23 reproduces the video signal and audio signal modulated by pulse shift keying (PSK) and pulse code modulation (PCM). When the A mode of BS broadcast is received, the BS tuner 23 reproduces four channels of PCM sound signals, and when the B mode is received, the BS tuner 23 reproduces two channels of PCM signals. A PSK demodulator 25 demodulates the signal and also detects the scrambling state of the signal, and a digital to analog (D/A) converter 26 converts the PCM digital audio signal from the PSK demodulator 25 to an analog sound signal. A level detector 27 detects the level of the received signal at the BS antenna 21 by detecting the output signal of the BS tuner 23 in the 8 MHz band. The tuned signal output from the BS tuner 23 is also fed to output terminals 28a, 28b, and 28c to external decoders. The BS tuner 23 is also connected to an input terminal 28d for receiving keyed AFC pulse from the MUSE signal.

The BS receiving section including the BS tuner 23 selects the desired channel and supplies the signal to the output terminals when the received signal is scrambled or when it is a MUSE format signal. If the received signal is some other sort of signal, it does signal processing as if it were an NTSC signal and changes over the sound signal to two channels corresponding to the video signal or two channels not corresponding to the video signal.

A MUSE down converter 51 can be connected for use in receiving a MUSE format signal (multiple sub-Nyquist encoding) to reproduce an HDTV signal. This HDTV signal is a TCI luminance and chrominance signal and a PCM sound signal. A Japanese Satellite Broadcast (JSB) decoder 52 can be connected for decoding a JSB scrambled broadcasting signal, and a communications satellite (CS) decoder can be connected for decoding a scrambled signal broadcast by a communications satellite.

The respective signals at output terminals 31a, 31b, 31c, 31d, 31e, and 31f from the MUSE down converter 51, JSB decoder 52, and CS decoder 53, as well as outputs from the VHF/UHF tuner 12 and the video processing circuit 24 are selected for display by an audio-video (AV) switch 32. The AV switch 32 also selects audio signals from the VHF/UHF tuner 12, the D/A converter 26, the MUSE down converter 51, the JSB decoder 52, and the CS decoder 53. A video processing circuit 33 processes the color television signal selected by the AV switch 32 to an RGB signal for display. A picture-in-picture circuit 34 performs the necessary picture-in-picture processing in the well-known manner. An RGB switch switches the RGB signals from the picture-in-picture circuit 34 in response to a signal from the control section. A cathode-ray tube 36 displays the images of the selected signal, and an audio processing circuit 37 processes the audio to provide tone control and the like for reproduction over a loudspeaker 38. Output terminals 31g, 31h supply audio and video signals to an optional VTR 70 for recording. Similarly, input terminals 31i, 31j receive video and audio signals from the optional VTR 70 for playback.

The video processing circuit 33 supplies the video signal to the cathode-ray tube 36 and the audio processing circuit 37 supplies the audio signal to the loudspeaker 38. When the signal of the selected channel is scrambled, these circuits operate for displaying and reproducing the unscrambled video and audio signals, respectively, from the JSB decoder 52. These terminals supply the color television signal and the audio signal selected by the AV switch 32 to the VTR 70 and, if necessary, for displaying picture-in-picture, the menu of operation, and the contents of the many functions and settings.

The system controller 41 controls the outputs based on the detected scrambled state of the PCM sound signal from the PSK demodulator 25 and on the state of the color television signal from video processing circuit 33. A memory 42 stores the control program and other operating settings set by the user. A BS microcomputer 43 controls the channel selection of the BS tuner 23. A digital-to-analog (D/A) converter 44 converts data from the system controller 41 to analog signals for controlling the volume of the reproduced sound. The display microcomputer 45 controls a menu display based on data from the system controller 41. A receiver 47 receives infrared radiation control signals from the remote controller 60. The system controller 41, the video processing circuit 33, the picture-in-picture circuit 34, the audio processing circuit 37, and the memory 42 are connected to each other by an I²C bus.

Figure 2:
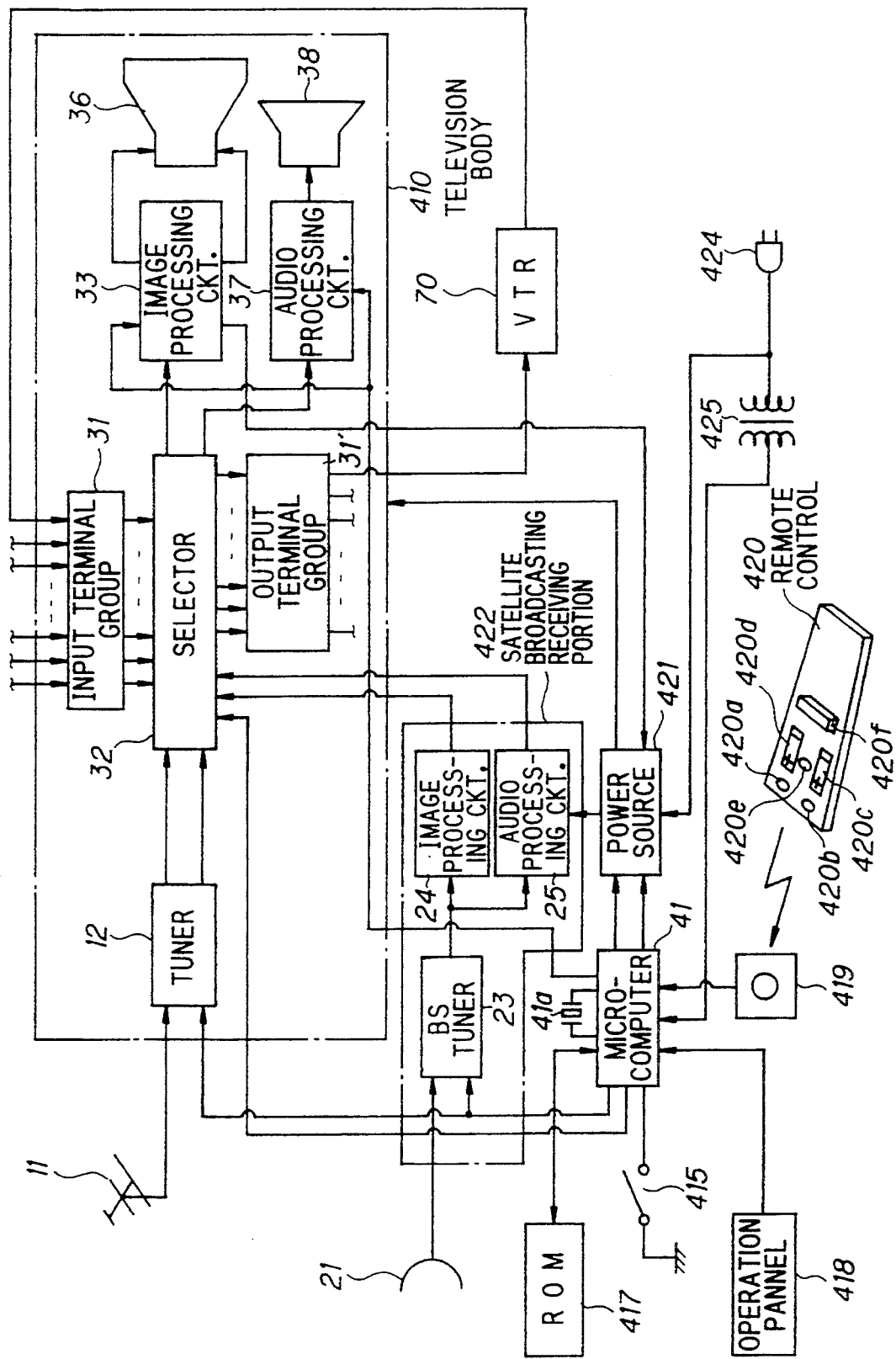
FIG. 2 is a block diagram of a television receiver according to another embodiment of this invention that receives a control signal from a remote controller for moving a cursor relative to a menu on the screen of the receiver.

In the similar television receiver of FIG. 2, an antenna 11 receives a VHF/UHF television signal and supplies it to the tuner 12. Tuner 12 is used to select the desired channel in response to a control signal from a controller 41 formed of a microcomputer that includes a video RAM, a ROM, and an additional RAM, all of which are internal. The controller 41 supplies control signals based on channel information signals supplied from a control panel 18 and from a remote controller 420 through a receiver 419. The controller 41 also memorizes parameters set by the user in a ROM 417 and performs many other operations synchronized by an oscillation signal from an oscillator 416a.

The tuner 12 changes the frequency of the television signal to the IF signal frequencies, 58.75 MHz in the video and 54.25 MHz in the audio, respectively. These IF signals are amplified, detected, auto-gain controlled, and then supplied to the AV switch 32. The AV switch 32 supplies video and audio signals from an input terminal group 31, the tuner 12, and a BS receiver 422 to the video processing circuit 33 and to the audio processing circuit 37 under control of a signal from the controller 41.

The VTR 70 is connected to the input terminal group 31 and to the output terminal group 31' for both video and audio signals.

The video processing circuit 33 separates the chrominance signal from the composite video signal and generates a color difference signal. The video processing circuit 33 then generates RGB signals and supplies these signals to the cathode-ray tube 36. The video processing circuit 33 also generates deflection signals for vertical and horizontal deflection fed to vertical and horizontal deflection coils not forming a part of the present invention. The video processing circuit 33 also supplies the RGB signals for displaying control characters on the cathode-ray tube 36 under the control of the controller 41. An audio processing circuit 37 processes the audio signals and supplies them to the loudspeaker 38.

BS receiver 422 receives the satellite broadcast signal, for example, 12 GHz signal, through a parabola antenna 21. The BS receiver 422 receives the FM TV signal and changes the frequency to the 1 GHz intermediate frequency (IF). The BS tuner 23 selects the band of the IF signal in response to control signals from the controller 41 as determined by the control panel 418 or the remote controller 420 and FM demodulates and supplies the demodulated signal to a video processing circuit 24 and to an audio processing circuit 25, respectively.

Video processing circuit 24 processes the FM video signal and supplies a demodulated signal to the AV switch 32. The audio processing circuit 25 demodulates and converts to analog the 4-phase DPSK audio signal and feeds the processed audio signal to the AV selector switch 32. A power supply 421 energizes the main portion 410 of the television receiver and the BS receiver section 422. The power supply 421 is connected by a plug 424 to a source of AC power. This power supply 421 supplies power to the system. When a switch 415 connected to the microcomputer 41 is operated the microcomputer 41 is energized by power converted by a transformer 425 and placed in stand-by. In the case of watching TV or recording signals by a VTR, the user operates switches on the control panel 418 or on a remote controller 420. By pushing power key 420a on remote controller 420 an infra-red signal is received through receiving unit 419 and fed to the microcomputer 41 to control the power supply 421. By pushing change input key 420b, the AV selector switch 32 selects an input signal from the tuner 12, the BS tuner 23, or from the input terminal group 31 under control of the microcomputer 41. Each stroke of the change input key 420b sequentially changes the outputs of the video and audio on the cathode-ray tube 36 and the speaker 38. By pushing channel changing key 420c, if the + key is pushed then the channel number increases and if the − key is pushed then the channel number is decreased. The channel number signal is also supplied to the microcomputer 41. Tuner 12 and BS tuner 23 select the channel and the desired image of signal is displayed on the screen of the cathode-ray tube 36 by using the channel changing key 420c. When operating the volume key 420d, if the + key is pushed then the sound volume increases and if the − key is pushed then the sound volume decreases. By pushing the menu key 420e, menu data is written into the video RAM in the microcomputer 41 and this data is read out and supplied to the cathode-ray tube 36 through video processing circuit 33 as RGB signals, and the menu is displayed. This data in the video RAM is read from a ROM that is also a part of the microcomputer 41.

Figure 3:
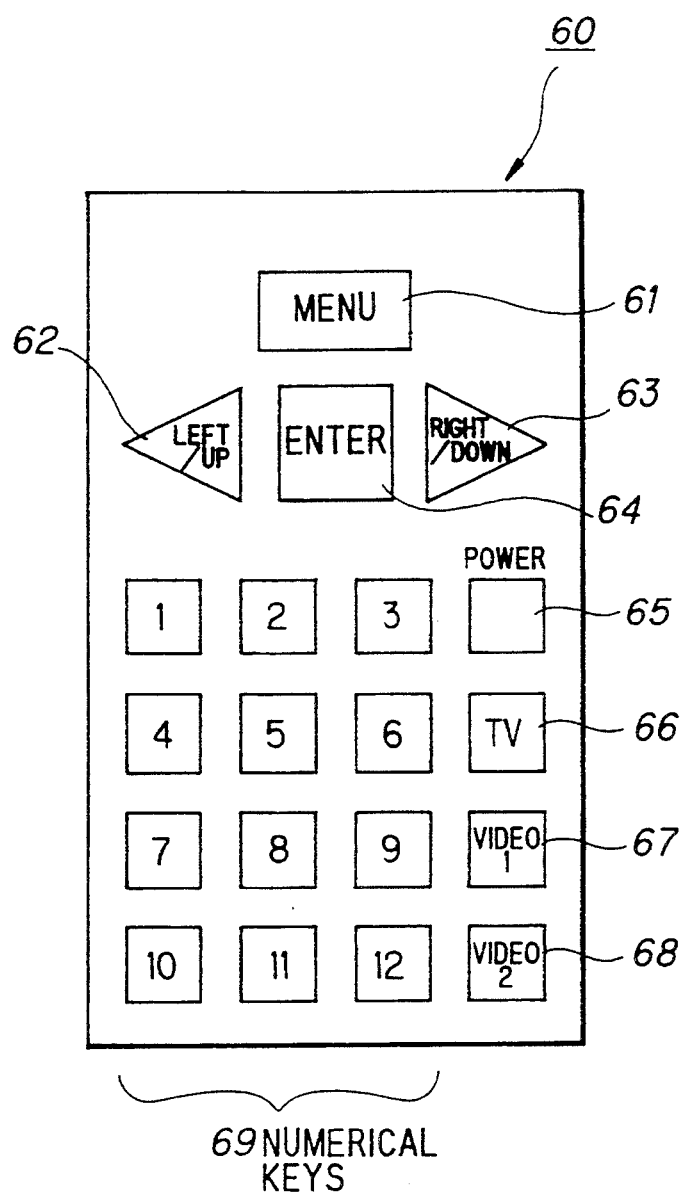
FIG. 3 is a plan view of a remote controller for use with the television receivers of FIGS. 1 and 2.

FIG. 3 shows the configuration of the keys of the remote commander 60 shown in FIG. 1. Menu switch 61 displays the menu on the sub-screen of the cathode-ray tube 36. Cursor switches 62, 63 move the cursor left to right or top to bottom on the screen for selecting one of the items of the menu. Decision switch 64 selects the item indicated by the cursor. Power switch 65 operates the power supply of the television set. Input changing switches 66, 67, 68 select the input source for display. Numerical keys 69 change the channel numbers. Thus, the remote controller 60 selects a channel desired by the user and selects a color television signal from the video processing circuit 24 by operating the AV switch 32, and displays the image on the cathode-ray tube 36. The remote controller selects a sound signal from the D/A converter 26 by operating the AV switch 32 and outputs the sound through speaker 38. For example, in mode A, the television sound or an independent sound is selected and in mode B it selects the television sound. The received video signal is supplied to the JSB decoder 52 if the PCM sound channel is determined to be scrambled. The signal decoded by the JSB decoder 52 is then fed through the AV selection switch 32 and displayed on the cathode-ray tube 36 and the sound is reproduced by the speaker 38. When the received signal is not scrambled it is supplied directly to the CRT and the speaker and not through the JSB decoder 52. If the independent sound mode is selected and the user selects a blank picture mode, the control section controls the power supply to interrupt power to the video processing circuit 33 and the cathode-ray tube 36, and to provide power to the BS converter 22, the BS tuner 23, the PSK demodulator 25, the D/A converter 26, the audio processing circuit 37, and the system controller 41.

If the user sets the channel reservation mode to avoid failing to view or record a program by later selecting an undesired channel, the control section selects the predetermined BS channel, and outputs color video signal and sound signal to the VCR 70 through the output terminals 31g, 31h respectively and inhibits channel selection if the user subsequently tries to change the channel, for example, by operating the remote controller 60.

If the user operates the remote controller 60 to display the menu on the screen, the control section controls the display microcomputer 45 for displaying a sequence for recording a BS signal, for example, in the sub-screen. If the user operates the remote controller 60 to perform the picture-in-picture mode, the control section controls the AV switch 32, and the picture-in-picture circuit 34 for displaying the BS program on the main screen and a VHF/UHF TV program in the sub-screen, for example. More specifically, when the user sets the channel number for viewing a VHF/UHF television broadcast by using the numerical keys 69 of the remote controller 60, the system controller 41 receives the channel number signal from the remote controller 60, controls the VHF/UHF tuner 12 to selects the set channel, and controls switches 32a, 32c for selecting the video and audio signals from the tuner 12, respectively. The video processing circuit 33 supplies the RGB signal converted from the color video signal fed by switch 32a to the cathode-ray tube 36. The audio processing circuit 37 supplies the audio signal to the speaker 38 with suitable processing, such as tone control. Thus, the user can watch the desired program on the VHF/UHF band.

For confirming the contents of the operations set by the user, the system controller 41 supplies channel number data to the display microcomputer 45 through the I²C bus. The display microcomputer 45 supplies an RGB signal, for displaying the channel number at the upper-right edge on the screen, for example, to the video processing circuit 33 through the RGB switch 35. The video processing circuit 33 superimposes the RGB channel number onto the image of the broadcast program of the VHF/UHF band.

When the user sets the BS channel by using the remote controller 60, the system controller 41 receives a control signal from the remote controller 60, controls the BS tuner 23 to select the BS channel, and detects whether the received program is an NTSC or hi-vision (HDTV) signal based on the state of synchronization of the PCM sound signal from the PSK demodulator 25 or based on the signal level at the level detection circuit 27. If an NTSC signal is detected, the system controller 41 controls the AV switch 32 to select the signal from the video processing circuit 24 and the signal from the D/A converter 26. If a hi-vision signal is detected, the system controller 41 controls the AV switch 32 to select the signal from the MUSE down converter 51.

In the normal mode, the analog sound signal is converted to a PCM signal and modulated by PSK, and then frequency division multiplexed. In the hi-vision mode, the sound signal is converted to special differential PCM signal and TCI modulated in the period of the vertical synchronization signal. The system controller 41 detects that the signal is an NTSC signal if the received level at the level detection circuit 27 is high and it detects the synchronization signal of the PCM sound signal. It is decided that the received signal is a hi-vision signal if the received level is high and the synchronization is unlocked. Detection of a normal signal or hi-vision signal is also made based on the presence of a keyed AFC pulse supplied by MUSE down converter 51 to the BS tuner 23 through the input terminal 28d.

The selected color video signal is supplied to the video processing circuit 33, and the selected audio signal is supplied to the audio processing circuit 37, so that the user can watch each channel by only the desired setting channel in spite of the kind of BS program mode.

When the user operates the remote controller 60 for displaying VHF/UHF program on the sub-screen at the time of watching a BS program, the system controller 41 receives a control signal corresponding to the picture-in-picture operation from the remote controller 60, controls the VHF/UHF tuner 12 for selecting the set channel, and controls the switch 32b for selecting the color video signal from the VHF/UHF tuner 12. The selected color video signal is supplied to the picture-in-picture circuit and converted to the RGB signal and supplied as a signal for the sub-screen to the video processing circuit 33 through the RGB switch 35. In this way, the user can watch a BS program on the main screen and a VHF/UHF program on the sub screen.

If the user sets the channel to a scrambled channel of the BS, the system controller 41 detects the scrambled state of the program based on a state of the PCM sound signal from PSK demodulator 25 and selects color video signal from the video processing circuit 24 and sound signal from the D/A converter 26, if the program is not scrambled. When the program is scrambled, it selects the color video and audio signal from the JSB decoder 52. When the user wants to listen to the sound of the independent sound program, if the sound signal of the television is scrambled, it selects the independent sound signal from the JSB decoder 52, and if the sound signal of the television is not scrambled, it selects the independent sound signal from the D/A converter 26. The number of combinations of scrambled and not scrambled programs is four, because there are scrambled and not scrambled states in the television sound signal (the same as video signal), and there are scrambled and not scrambled states in the independent sound signal. When the television sound signal is selected, the system controller 41 performs control based on the scrambled state of the television sound signal, and the user can watch both scrambled and non-scrambled programs without manually changing the mode. When the independent sound signal is selected, the system controller 41 performs control based on the scrambled state of the television sound signal and the independent should signal, and the user can listen in each case without manually changing the mode.

If the video signal is not scrambled, or if the video signal is scrambled and the non-display picture mode is selected, the signal path is not thorough the JSB decoder 52, so the sound quality is not damaged by passing through many circuits. The decision as to whether the program is scrambled or not is based on the 12th bit of a group of control bits of the PCM sound signal that shows the state of scramble of the video signal.

When the user sets a channel in the CS broadcasting system by using the remote controller 60 for listening to a music program, for example, the system controller 41 receives the control signal from the remote controller 60, controls the BS tuner 23 to select the set channel, and detects whether it is scrambled or not based on the state of the PCM sound signal from the PSK demodulator 25. If the not scrambled state is detected, the AV switch 32 is controlled to select a sound signal from the D/A converter 26. On the contrary, if a scrambled signal is detected, the AV switch 32 is controlled to select the sound signal output from the CS decoder 53. The sound signal of a nonscrambled program is converted to PCM signal and PSK duplex frequency modulated, and the sound signal of a scrambled program is first scrambled, PCM converted, and then PSK duplex modulated. The system controller 41 detects the scrambled or nonscrambled states based on the 8th bit of a range of bits from the PSK demodulator 25. The selected sound signal is supplied to the audio processing circuit 37, and the user can listen to the desired program without noticing whether the program is scrambled or not. According to this invention, the mode conversion of a scrambled or nonscrambled signal is not only enabled automatically as described but also permits manual selection using the remote controller 60.

When the user presses the menu switch 61 of the remote controller 60, the system controller 41 receives a control signal for displaying the main menu relating to each functional setting, and supplies corresponding data to the display microcomputer 45 for displaying the main menu. The characters used for displaying the main menu can be stored in the memory 42 and output onto the I²C bus. The display microcomputer 45 displays the main menu on the sub-screen 36b, which is a part of the main screen 36a of the face of the cathode-ray tube 36 shown in FIG. 4b, based on this data from memory 42.

Figure 5:
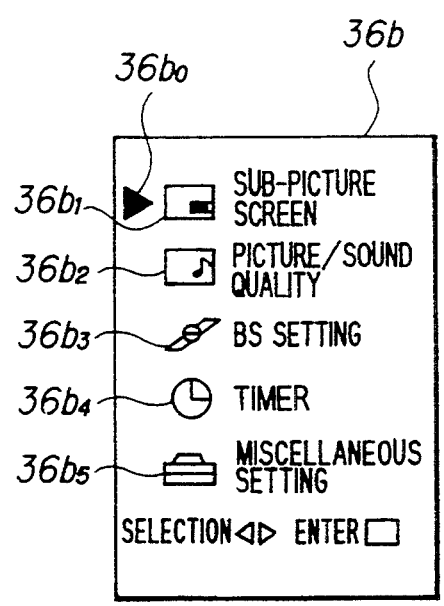
FIG. 5 is a view of a menu display on a screen of the television receivers of FIGS. 1 and 2.

FIG. 5 shows the main menu display including a display setting parameter $36b_1$ of the sub screen in the picture-in-picture operation, a parameter $36b_2$ for setting picture and sound qualities, a parameter $36b_3$ for changing over the sound in the BS receiving mode, a parameter $36b_4$ for setting the recording reservation, a parameter $36b_5$ for setting the change-over of a bilingual sound mode, and a cursor $36b_0$. The display microcomputer 45 supplies an RGB signal for displaying the setting parameters and cursor to the video processing circuit 33 through the RGB switch 35.

Figure 4A:
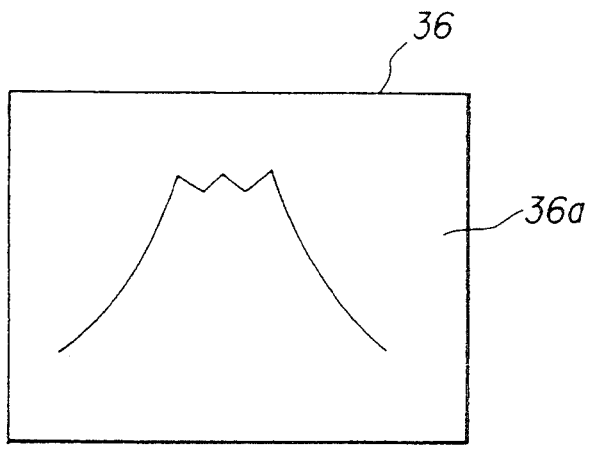
FIG. 4 consists of images showing a main screen and a sub-screen on the cathode-ray tube of the receivers of FIGS. 1 and 2.
Figure 4B:
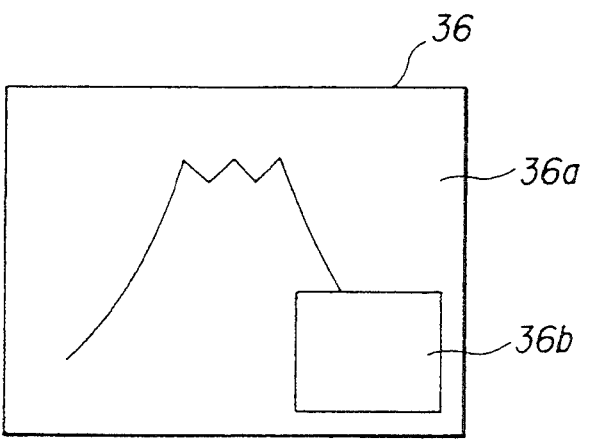

The video processing circuit 33 converts the color video signal at the AV switch 32 to the RGB signal, switches this RGB signal and the RGB signal from the RGB switch 35, displays the picture based on the signal from the AV switch 32a on the main screen 36a and displays the picture based on the RGB signal from the RGB switch 35 on the sub screen 36b, as shown in FIG. 4b.

The user can move the cursor $36b_0$ by pushing cursor switches 62, 63 of the remote controller 60 while watching the displayed menu. If the user pushes the enter switch 64, the setting parameter pointed to by the cursor $36b_0$ is selected, and a new menu is displayed corresponding to the selected parameter.

Figure 4C:
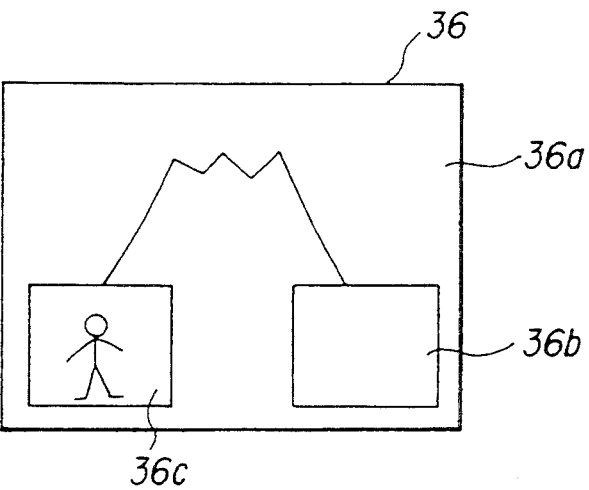

When the user selects from the main menu of FIG. 5 the sub-screen parameter $36b_1$, two sub screens 36b, 36c are displayed at the same time at the lower part of the main screen 36a, as shown in FIG. 4C. A color video signal from one of the video processing circuit 24 or the VTR 70 is selected by the switch 32b of the AV switch 32, and the selected picture is displayed on the sub-screen 36c.

The sub-screen menu is displayed on sub-screen 36c and as shown in FIG. 6a includes menu item $36b_{11}$ for returning sub-screen display to the main menu, item $36b_{12}$ for setting the source of the display on sub-screen 36c, item $36b_{13}$ for setting the course channel, item $36b_{14}$ for setting the sound volume corresponding to the picture in sub-screen 36c at the earphone output terminal, item $36b_{15}$ for swapping the pictures in the main screen 36a and the sub-screen 36c, item $36b_{16}$ for setting the position of the sub-screen 36c on the main screen 36a, item $36b_{17}$ for setting the size of the sub-screen 36c, and a cursor $36b_{10}$. As a result, the user can set new parameters of the sub screen 36c, while confirming the displayed picture on the sub-screen 36c. For example, when the user elects to swap the main and sub screen displays by selecting item $36b_{15}$ using the cursor switches 62, 63 and the enter switch 64, the system controller 41 swaps the images of the main screen 36a and the sub-screen 36c, controls the AV switch 32, and stores setting parameter in the memory 42.

The system controller 41 dims all other items being displayed except the selected setting parameter. This is the so-called half-tone and in the example of FIG. 6b all items except item $36b_{15}$ are shown dimmed by the dotted background. The data for dimming is sent by controller 41 to the display microcomputer 45 by the I²C bus. The display microcomputer 45 controls the reduced RGB signal levels of all items except the swap item $36b_{15}$ to the video processing circuit 33 through the RGB switch 35.

Figure 7:
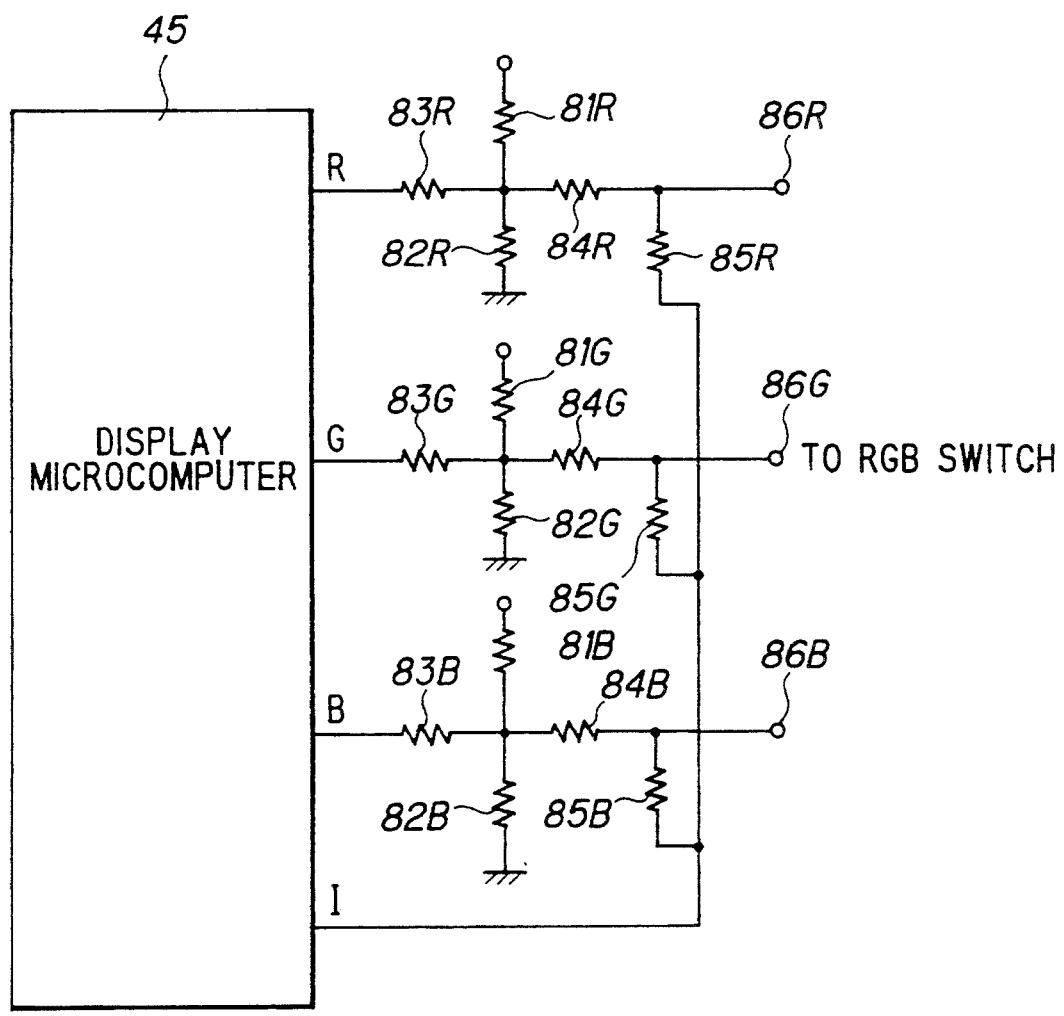
FIG. 7 is a schematic of a circuit of the television receiver of FIGS. 1 and 2 for controlling the display on the sub-screen.

An embodiment for accomplishing this display dimming is shown in FIG. 7. The circuit for varying the output level of the display microcomputer 45 comprises resistors for DC bias 81R, 82R, resistors for matching output impedance 83R, 84R, and a resistor for varying the output level 85R. Resistors 81R, 82R are connected in series between a power source and ground. Resistors 83R, 84R are connected in series between the output of the red (R) signal of the display microcomputer 45 and an output terminal 86R. Resistor 85R is connected to a point between a signal output I of the display microcomputer 45 and output terminal 86R. When the dimmer mode is generated, the display microcomputer 45 shifts the level of signal I to low. Normally, the level of that signal I is high or open circuited. As a result, the level of the R signal supplied to the RGB switch 35 through the output terminal 86R is reduced. The blue (B) and green (G) signals are controlled the same as the R signal, and level controlled RGB signals are supplied to the video processing circuit 33. After that all items except the swap item $36b_{15}$, for example, are dimmed, and the user can confirm the selected setting item easily.

In this sub-screen menu, if the user tries to set the source of the sub-screen 36c display to the VTR 70, it is impossible to change the channel of the sub-screen 36c to the VTR 70, because there is no definition of the channel when the VTR 70 is reproduced. As shown in FIG. 6c, after selecting the source to be VTR 70, the display for the channel setting item $36b_{13}$ is dimmed, so the user can easily recognize that this item is not suitable to select. Thus, the memory 42 need not memorize new menu data after selecting VTR 70 as the source and, because only one menu data is used in common with plural states of the system, the required capacity of the memory 42 is minimized.

Figure 8:
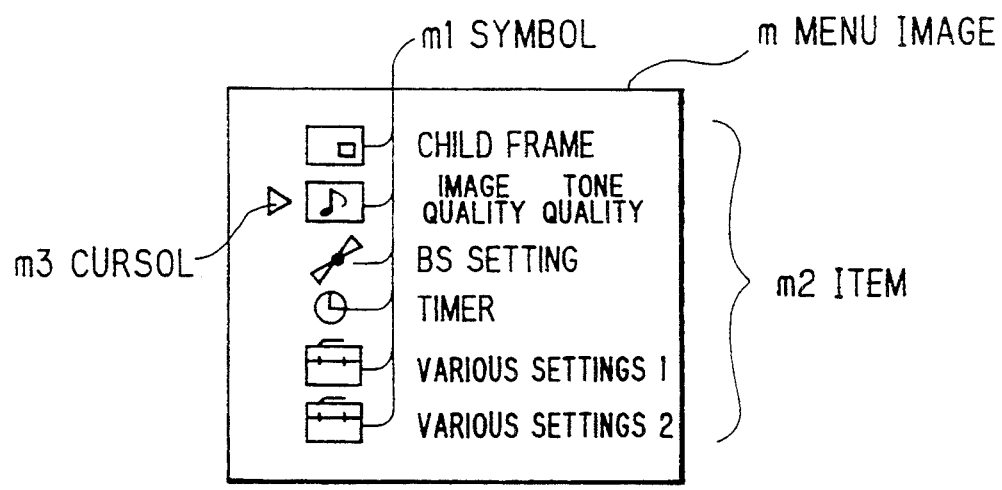
FIG. 8 is a view of another menu showing a main menu and a hierarchy thereof.

Another menu is shown in FIG. 8 and will be described in connection with the television receiver of FIG. 2. When the user pushes the menu key 420e of the remote controller 420, the menu picture shown in FIG. 8 is displayed on the screen of the cathode-ray tube 36. The selection and decision roller 420f is used to move a cursor m3 when the menu is displayed on the screen of the cathode-ray tube 36. By rotating this roller 420f in one direction or the other, the cursor m3 is moved at the left of symbols m1 having legends m2, and the selected item m2 is entered by depressing roller 420f and closing internal switch contacts.

Figure 9:
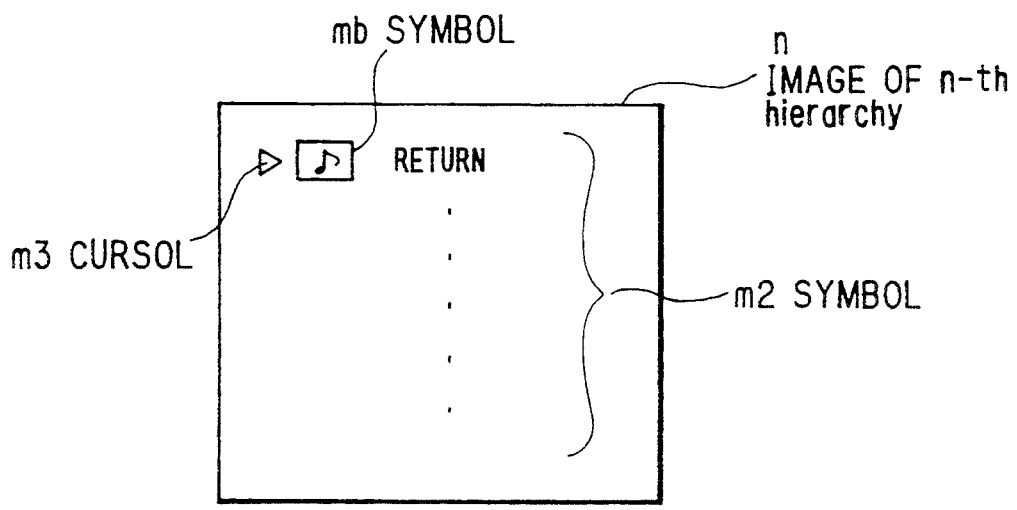
FIG. 9 is a view of another menu showing an $n_{th}$ hierarchy thereof.

When item m2 is selected from the menu and entered a so-called nth layer of hierarchy is displayed on the screen, as shown in FIG. 9. This means that the selected item is placed at the head of the menu, so that when that main menu is revisited it makes it easy for the user to remember the item most recently selected. By moving roller 420f, the desired item m2 is selected by pushing 420f the desired item m2 is entered based on the menu of FIG. 8. A sub-menu is then displayed and utilized and following that the menu in FIG. 9 is displayed. Parameter data of each item set by this process are memorized at ROM 417, which may be embodied as an EEPROM. If the user wants to stop the display the menu key 420e is pushed, and the system controller 41 stops sending menu data to the display. By providing control of the menu display in this way the selected item of the menu may also be displayed as a different color.

Figure 10:
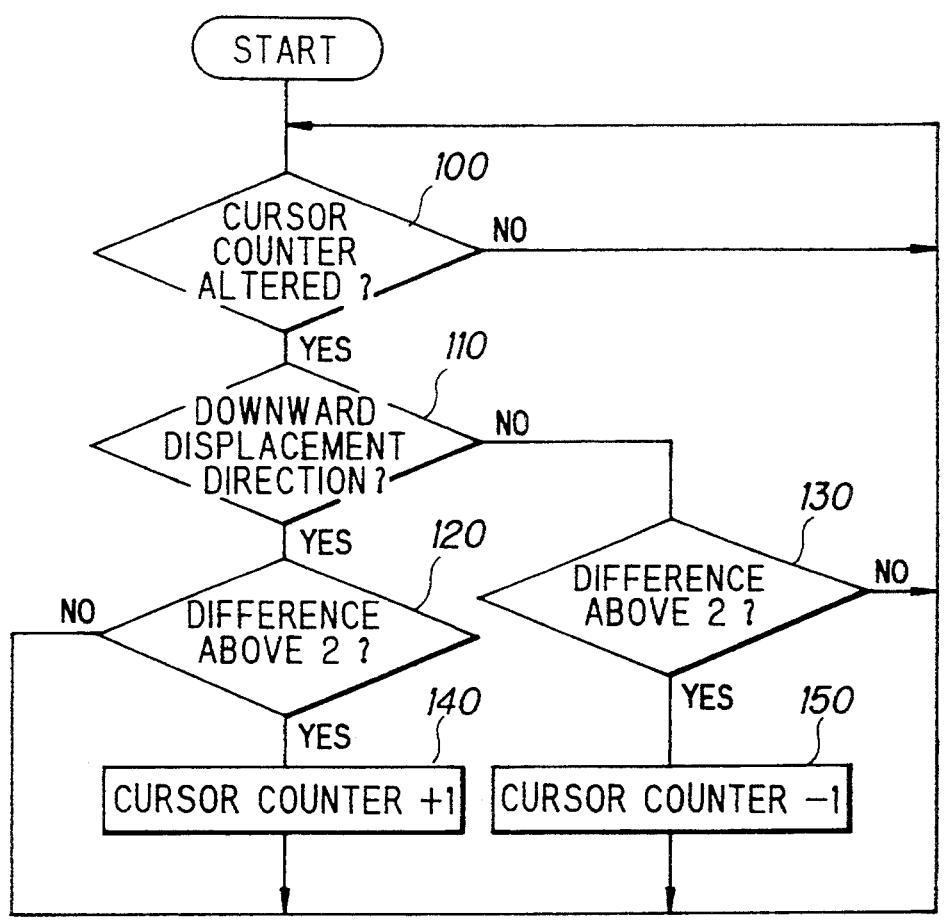
FIG. 10 is a flow chart of a method of moving a cursor of the television screen according to this invention.

An operational flow chart of the method for moving cursor m3 in the menu by the remote controller 420, is shown in FIG. 10. In FIG. 10, at step 100 it is determined whether the cursor counter internal to the microcomputer 45 has been altered. If so the method proceeds to step 110, if not, it reverts to step 100 again. In that regard, by rolling roller 420f of the remote controller 420, 45 msec. pulses are supplied to the system controller 41 through the receiver 419. At step 110, if the moving direction is downward then the method proceeds to step 120, otherwise the method proceeds to step 130. At the step 120, if the difference in the value of cursor counter and a register used to determine if the cursor counter was altered is greater than two, then the method proceeds to step 140, otherwise the method proceeds to step 100. At step 130, if the difference in the value of the cursor counter and the register is greater than two, then the method proceeds to step 150, otherwise go to step 100. At step 140, the cursor counter is incremented by one and this value is stored in the register, and the method reverts back to step 100. At step 150, cursor counter is decreased by one and this value is stored in the register, and the method reverts back to step 100. Thus, by each rolling of the roller 420f of the remote controller 420, the cursor m3 is moved step by step correctly.

Figure 11:
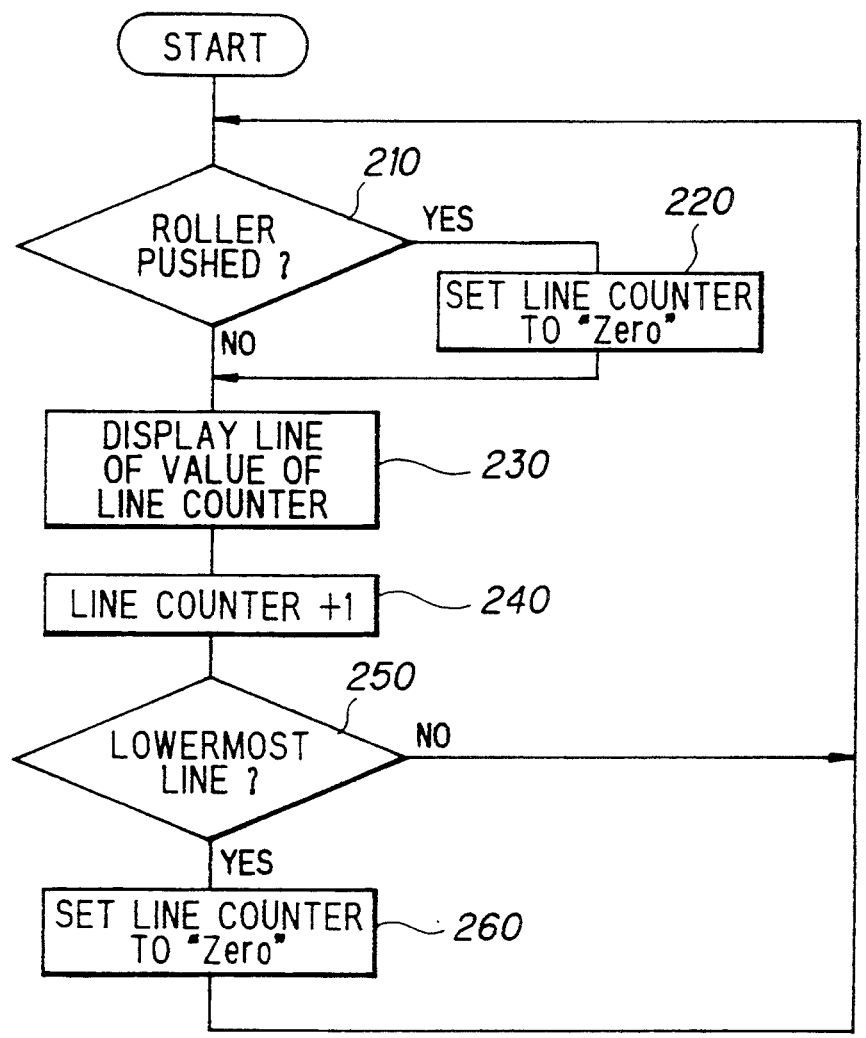
FIG. 11 is a flow chart a of method of moving a cursor for selecting an item on the screen.

FIG. 11 is a flow chart showing the method of changing the color of a selected item from the color of other, unselected items. As shown in relation to FIG. 8, the item relating to picture/sound quality m2 is selected by the roller 420f and entered by pushing roller 420f. According to the present invention it is provided that only this item m2 and its corresponding symbol m1 are displayed in white, for example, whereas all other items of m2 and m1 are displayed by a gray color, for example. At the first step 210 it is determined if the roller 420f of the remote controller 420 is pushed. If so, the method proceeds to step 220, otherwise it goes to step 230. At step 220 zero is set into a line or row counter, and the method proceeds to step 230. At step 230 the item of the menu that corresponds to the value in the line counter is displayed. That is, in the FIG. 8 menu m the selected item is displayed as a white color and the unselected items are displayed as a gray color. This sequence is performed by changing the RGB data of the video RAM of the system controller 41. At step 240, the row counter is incremented and proceeds to step 250. At step 250, the value of the row counter is checked and if selected item m2 of the menu m is the lowest row, then the method proceeds to step 260, otherwise it reverts to step 210. At step 260, zero is loaded into or set in the row counter the same as in step 220, and the method proceeds to step 210 again. When roller 420f is not pushed, legend m2 and symbol m1 are checked row by row with 16.7 msec pulses and the RGB data is rewritten into the video RAM. When the last row is reached, the first row of RGB data is rewritten into the video RAM by loading zero into the row counter. When roller 420f is pushed, the row counter is forced to load zero and the first row of the video RAM is rewritten, in spite of not being the first row of row counter.

Figure 12:
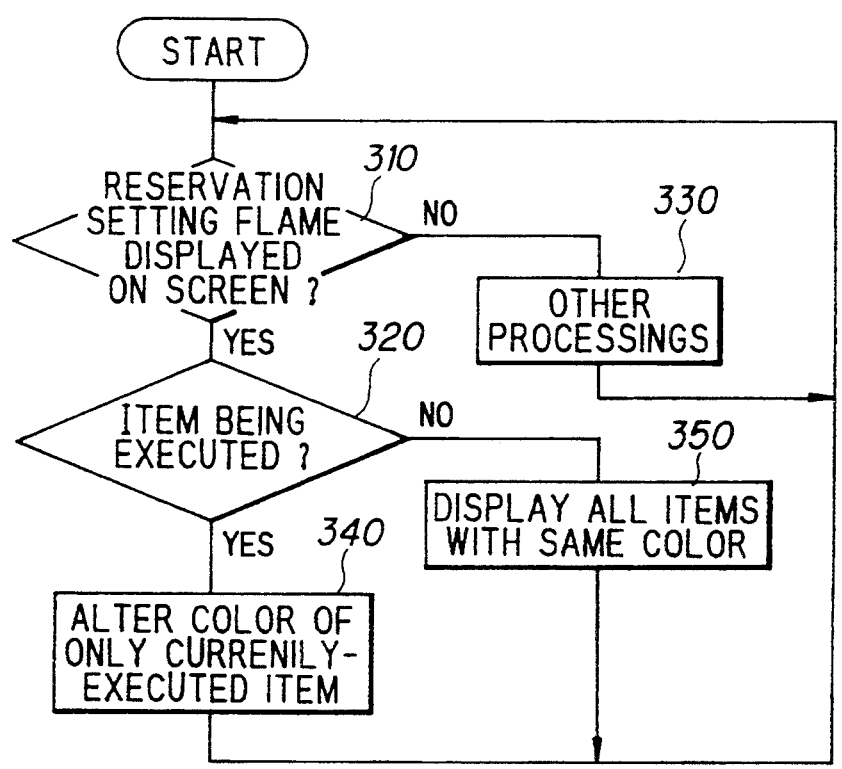
FIG. 12 is a flow chart of a method for changing the color of a displayed menu.

In FIG., 13 a reservation screen is shown that is also able to be displayed by operation of the remote controller 420 and roller 420f. When the reservation screen is displayed, the item m2' that is currently being executed is displayed in white whereas all other items are displayed by different color from m2', for example, gray. The flow chart for accomplishing this is shown in FIG. 12, in which in step 310 it is determined if it is the reservation screen being displayed, if so, then the method proceeds to step 320, otherwise it to goes step 330. At step 320, it is determined whether there is an item currently being executed. If so, the method proceeds to step 340, otherwise it goes to step 350. At step 330 other operations are performed and the method reverts to step 310 again. At step 340 the RGB data in the video RAM relating to the currently executed item m2' are changed, and the method starts over again. At step 350, because there is no currently selected item the video RAM is rewritten so that all items are of same color, and the method returns to step 310.

Figure 14:
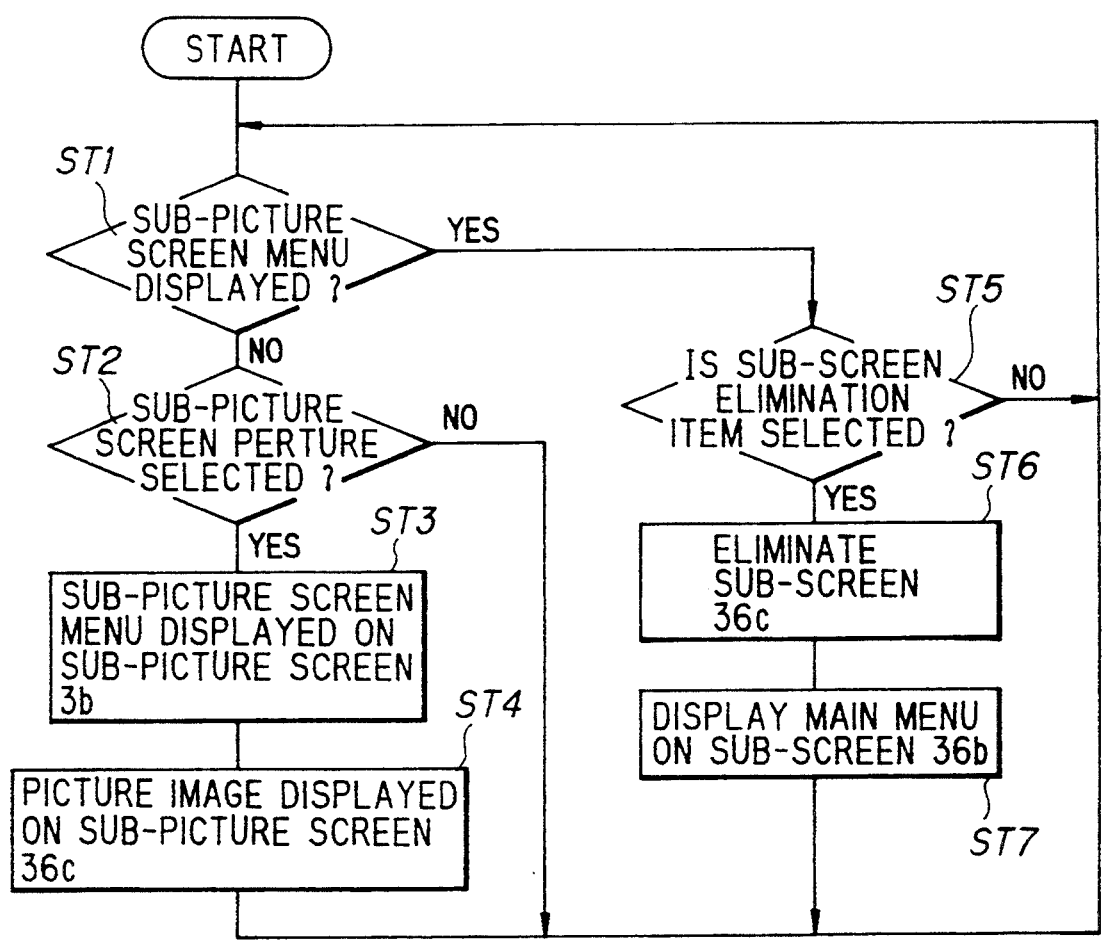
FIG. 14 is a flow chart of a method for selecting the menu on the sub-screen of the television receiver of FIGS. 1 and 2.

The method for changing the main and sub-menu picture is represented in FIG. 14, in which in step ST1 the system controller 41 decides whether there is a sub-screen menu or not on the sub-screen 36b. If there is, then the method proceeds to step ST5, otherwise step ST2 is next. At step ST2, it is determined if the sub-screen item $36b1$ was selected at the main menu, and if so, then go to step ST3, otherwise go to step ST1. At step ST3 the system controller 41 controls the display microcomputer 45 to the display sub-screen menu on the sub-screen 36b and the method proceeds to ST4 at which time the picture image is displayed on the sub-screen 36c. At step ST5, it is determined if item $36b1$ is selected on the main menu, and if so then go to step ST6, otherwise go to step ST1. At step ST6, the system controller 41 controls the picture-in-picture circuit 34 to erase sub-screen 36c and the method proceeds to step ST7. At step ST7, the system controller 41 displays the main menu on the sub-screen 36b and returns to step ST1. That is the screen swap operation.

Figure 15A:
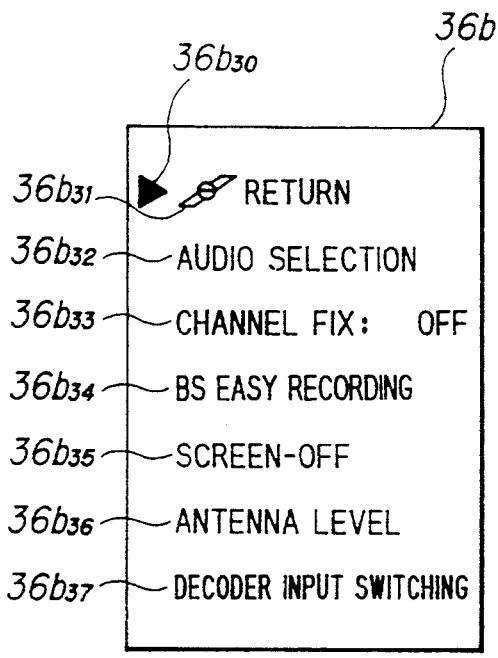
FIGS. 15 and 16 are views showing the displayed menu when the color of a selected, displayed item changes.
Figure 15B:
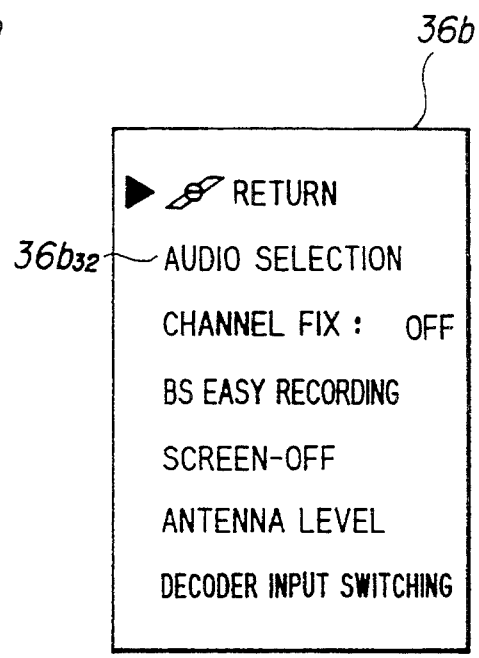

In FIG. 15a, if BS setting item $36b_3$ is selected from main menu of FIG. 5, items $36b_{31}$, $36b_{32}$, $36b_{33}$, $36b_{34}$, $36b_{35}$, $36b_{36}$, and $36b_{37}$ are displayed on the screen, along with the cursor $36b_{30}$. In this BS setting mode, the input prohibited items are as follows, sound selection item $36b_{32}$ in the B mode, the antenna level item $36b_{36}$ except during BS receiving, and decoder input change over item $36b_{37}$. When the B mode is received, the display microcomputer 45 operates to dim sound change-over item $36b_{32}$, as shown by the dotted background in FIG. 15b.

Figure 16A:
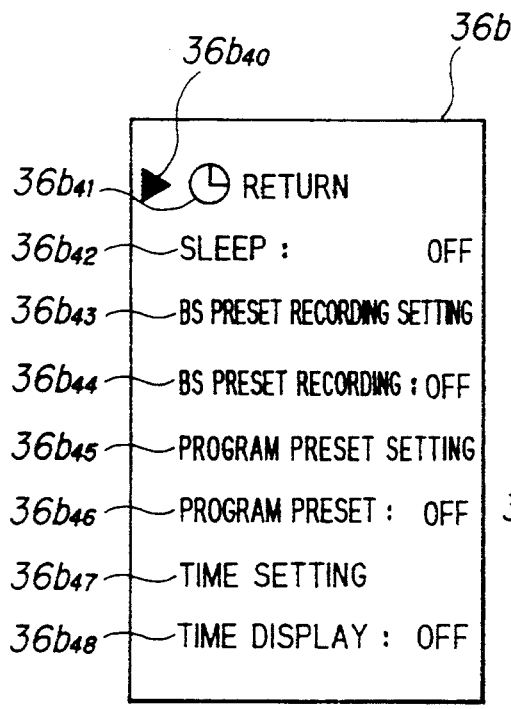

When timer item $36b_4$ is selected on the main menu of FIG. 5, there are many items displayed as shown in FIG. 16a comprising the timer menu, such items are shown at $36b_{41}$, $36b_{42}$, $36b_{43}$, $36b_{44}$, $36b_{45}$, $36b_{46}$, $36b_{47}$, and $36b_{48}$ in FIG. 16a, along with cursor $36b_{40}$.

The user selects the desired items using the cursor switches 62, 63 and the enter switch 64 of the remote controller 60, while watching the timer menu on the sub screen 36b. For example, when the user moves the cursor $36b_{40}$ to the sleep item $36b_{42}$ and pushes the enter key 64, the display microcomputer 45 operates to dim all items except the selected sleep item $36b_{42}$, and the system controller 41 starts a time count and shuts down the power after a predetermined time period has elapsed.

Figure 16B:
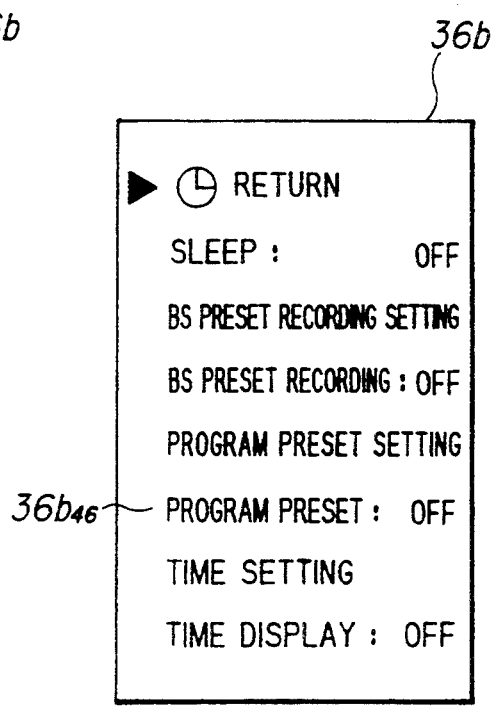

There are many prohibited items in this time menu shown in FIG. 16a, for example, a recording start time for BS recording reservation item $36b_{44}$, a BS recording reservation item $36b_{44}$ unless several required parameters have been set, a program reservation item $36b_{46}$ unless several required parameters corresponding to program reservation setting item $36b_{45}$ have been set. When the prerequisite parameters corresponding to program reservation setting item $36b_{45}$ are not entered, the display microcomputer 45 controls to dim the program reservation item $36b_{46}$, as shown by the dotted background in FIG. 16b.

Figures 17A, 17B:
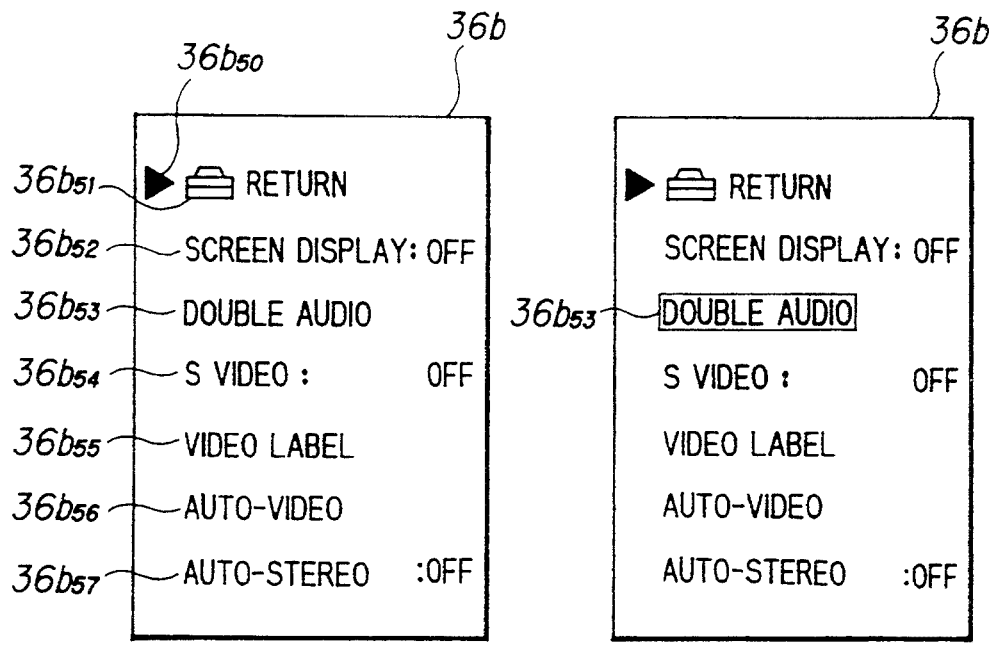
FIGS. 17 and 18 are views showing the displayed menu when a half-tone color display of an item indicates that the item is not available.

When the user selects the miscellaneous setting item $36b_5$ in the main menu of FIG. 5, the miscellaneous setting menu 1 or the miscellaneous setting menu 2 are displayed alternatively on the sub-screen 36b. In this miscellaneous setting menu 1, as shown in FIG. 17a, there are displayed items $36b_{51}$, $36b_{52}$, $36b_{53}$, $36b_{54}$, $36b_{55}$, $36b_{56}$, and $36b_{57}$, along with cursor $36b_{50}$. The user selects the desired item by using the cursor switches 62, 63 and the enter switch 54 of the remote controller 60, while watching the miscellaneous setting menu 1 displayed on the sub-screen 36b. For example, when the user moves the cursor $36b_{50}$ to bilingual sound item $36b_{53}$ and pushes the enter switch 64, the display micro-computer 45 operates to dim all setting items except the selected bilingual item $36b_{53}$, and the system controller 41 controls the audio processing circuit 37 for transmitting the selected main or sub-sound to the speaker 38.

Figures 18A, 18B:
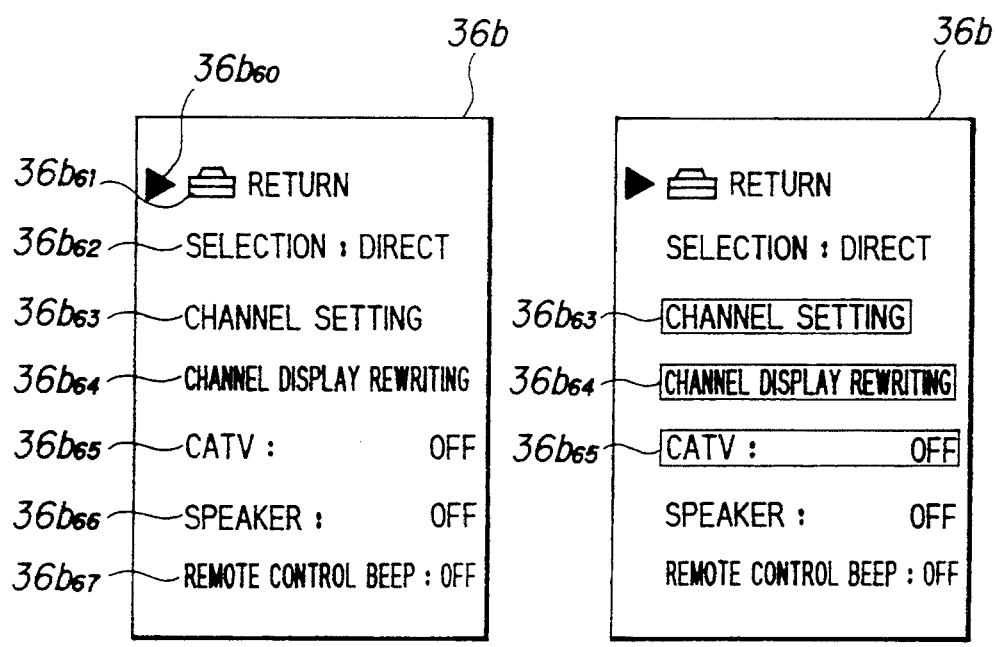

In the miscellaneous setting menu 2, as shown in FIG. 18a, there are displayed items $36b_{61}$, $36b_{62}$, $36b_{63}$, $36b_{64}$, $36b_{65}$, $36b_{66}$, and $36b_{67}$, along with cursor $36b_{60}$. The user selects the desired item by using the cursor switches 62, 63 and the enter switch 64 of the remote controller 60, while watching the miscellaneous setting menu 2 displayed on the sub-screen 36b. For example, when the user moves cursor $36b_{60}$ to a remote control signal receiving confirmation sound item $36b_{67}$ and pushes the enter switch 64, the display micro computer 45 operates to dim all other setting items except the selected remote control signal receiving confirmation sound item $36b_{67}$, and the system controller 41 controls the audio processing circuit 37 so as not to generate the confirmation sound from the speaker 38.

When the menu key 61 of the remote controller 60 is pushed and the main menu shown in FIG. 5 is displayed the miscellaneous setting menu 1 shown in FIG. 17a is displayed by selecting the miscellaneous setting item $36b_5$ using the cursor switches 62, 63 and the enter key 64. In the miscellaneous setting menu 1, after selecting the bilingual item $36b_{53}$, the main sound is set as an output sound, and all items except the bilingual sound item $36b_{53}$ are dimmed, and the main sound is reproduced through the speaker 38. In this selected state, if the input source of this television is set to the VTR 70, the bilingual item $36b_{53}$ becomes a prohibited item because there is no bilingual mode in the VTR input mode. This television receiver tells the user that the selection is prohibited by dimming the bilingual item $36b_{53}$ and returning the sub-screen $36b_1$ to the miscellaneous setting menu 1. After that, when the VTR 70 is connected and operated, based on the video signal from the VTR 70 the operation of setting the bilingual item $36b_{53}$ is prohibited. Thus, it prevents a mistake relating to re-setting the setting value of the bilingual mode in the memory 42 by misoperation of the change-over bilingual mode item.

By means of above-described function, the television receiver of this invention can provide good conditions for visual confirmation and easy operation. When the control according to selected item is completed, for example, in FIG. 6a after setting the signal source to the VTR 70, the user can know the condition not to attempt to set the channel by the dimmed display of the channel item $36b_{13}$, as shown in FIG. 6c. That is, when the source is set to the VTR 70 by dimming channel item $36b_{13}$ on the sub-screen menu the user will know not to change the channel, so there is no need to store any such data in the memory 42. This means that data for only one screen can be used in common with plural states, and only a small capacity for the memory 42 is required.

The apparatus of this invention affords many advantages, such as the following, and there are many functions for achieving high performance, and many items corresponding to these functions are displayed on the display area. When one of these displayed items is selected, the other items are displayed in a dimmer style. These features make it easier to confirm the set item by the user, and make operation easier for the user. Furthermore, by dimming items on the menu that are not able to be selected, there is no need to memorize a menu screen that contains selection prohibited items, so that only one menu screen is used in common with plural states and so memory capacity can be reduced. Furthermore, according to this invention by moving the cursor smoothly in a sequential fashion, there is an advantage that the user can operate easily and correctly to select items. In the menu that contains an item being performed, this item can be displayed in a different color than the other items, and this function makes the user recognize what item is being performed and prevents mistakes in changing parameters.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. A video display apparatus comprising:
   display means for receiving a video signal generated from a picture signal and a menu display signal and for displaying a picture corresponding to said picture signal and a menu corresponding to said menu display signal;
   video processing means for receiving said picture signal and said menu signal, for processing said picture signal and said menu display signal and for generating said video signal;
   operation means operated by a user of the video display apparatus for controlling and selecting operations indicated as corresponding items in said menu by generating user signals;
   display control means for controlling display characteristics of unavailable items in said menu which correspond to unavailable operations by modifying a common menu display signal to generate said menu display signal; and
   system control means for receiving said user signals, for processing said user signals, for generating said common menu display signal from common menu data stored in a memory means and for controlling said picture signal and said menu display signal in accordance with said user signals whereby said display characteristics of said items in said menu display are controlled through said display control means.

2. A video display apparatus as claimed in claim 1 wherein said video processing means further comprises:
picture-in-picture means for displaying said menu and said picture on a sub-screen by modifying said picture signal.

3. A video display apparatus as claimed in claim 1 wherein said operation means comprises:
a remote controller for controlling and selecting operations at a position remote from said apparatus by generating remote control signals, and
a receiver for receiving said remote control signals transmitted from said remote controller and for generating said user signals in accordance with said remote control signals.

4. A television receiver comprising:
display means for receiving a video signal generated from a picture signal and a menu display signal and for displaying a picture corresponding to said picture signal and a menu corresponding to said menu display signal;
video processing means for receiving said picture signal and said menu display signal, for processing said picture signal and said menu display signal and for generating said video signal;
an operation member operated by a user for controlling and selecting operations identified as corresponding items in said menu by generating user signals;
a speaker for receiving an audio signal and for producing sounds corresponding to said audio signal;
an audio processing circuit for receiving a sound signal, for processing said sound signal and for generating said audio signal;
display control means for controlling display characteristics of unavailable items in said menu which correspond to unavailable operations by modifying a common display menu signal to generate said menu signal; and
system control means for receiving said user signals, for processing said user signals, for generating said common menu display signal from common menu data stored in a memory means and for controlling said picture signal and said menu signal in accordance with said user signals whereby said display characteristics of said items in said menu are controlled through said display control means.

5. A television receiver as claimed in claim 4, wherein said video processing means further comprises:
picture-in-picture means for displaying said menu and said picture on a sub-screen by modifying said picture signal.

6. A television receiver as claimed in claim 4 wherein said operation member comprises:
a remote controller for controlling and selecting operations at a position remote from the television receiver by generating remote control signals, and
a receiver for receiving said remote control signals transmitted from said remote controller and for generating said user signals in accordance with said remote control signals.

7. A television receiver as claimed in claim 4 further comprising a tuner for receiving a broadcast program and for providing a signal to said video processing means and said audio processing circuit.

8. A television receiver as claimed in claim 7 wherein said tuner receives said broadcast program from a VHF/UHF broadcasting band.

9. A television receiver as claimed in claim 7 wherein said tuner receives said broadcast program from a satellite.

10. A television receiver as claimed in claim 9 further comprising a decoder for receiving said broadcast program, for decoding said broadcast program according to a predetermined format to produce said signal and for providing said signal to said video processing means and said audio processing circuit.

11. A television receiver as claimed in claim 10 wherein said decoder decodes a CS format signal broadcast by a communications satellite.

12. A television receiver as claimed in claim 10 wherein said decoder decodes a scrambled video signal and a scrambled audio signal.

13. A television receiver as claimed in claim 10 wherein said decoder decodes a MUSE format video signal and an audio signal.

14. A television receiver as claimed in claim 4 further comprising an input terminal for receiving an input video signal and an audio signal from another apparatus.

15. A television receiver as claimed in claim 4 further comprising an output terminal for outputting a video signal and an audio signal to another apparatus.

16. A television receiver as claimed in claim 6 wherein said remote controller includes a roller for rolling to select desired operations.

17. A television receiver as claimed in claim 6 wherein said remote controller includes an enter switch for entering an item selected by the user.

18. A television receiver as claimed in claim 6 wherein said remote controller includes numerical keys, a left key, a right key, and an enter key on a same face of the remote controller.

19. A television receiver as claimed in claim 6 wherein said menu is displayed on a main screen of said display means or a sub-screen thereof.

20. A television receiver as claimed in claim 4 wherein said corresponding items are formed of: (1) characters indicating names of corresponding operations; and (2) marks representing images of corresponding operations, and wherein a movable cursor provides an indication of movement to a position of a selected item.

21. A television receiver as claimed in claim 4 wherein said display characteristics includes normal lighted characters and marks and dim lighted characters and marks.

22. A television receiver as claimed in claim 21 wherein said normal lighted characters and marks are used for indicating items available for selection and said dim lighted characters and marks are used for indicating items not available for selection.

23. A television receiver as claimed in claim 20 wherein said movable cursor is moved by operation of a key of a remote controller.

24. A television receiver as claimed in claim 23 wherein said key comprises an up key and a down key.

25. A television receiver as claimed in claim 24 wherein said key comprises a roller of said remote controller.

26. A television receiver as claimed in claim 4 wherein said video processing means further comprises an RGB switch for receiving a signal for controlling display characteristics of said items in said menu from said display control means.

27. A television receiver as claimed in claim 26 further comprising a resistor network connected between said display control means and said RGB switch for controlling respective R, G, and B signals.

28. A television receiver as claimed in claim 27 wherein said resistor network is used as a dimmer circuit for dimming said unavailable items in said menu.

29. A television receiver as claimed in claim 4 wherein said menu has a hierarchical structure.

30. A television receiver as claimed in claim 29 wherein each screen of a layer of said hierarchical structure has a means for moving to a different screen of said hierarchical structure.

31. A television receiver as claimed in claim 30 wherein said means for moving is one of said items selected by a cursor.

32. A television receiver as claimed in claim 4 wherein said corresponding items are formed of colored characters and marks of predetermined color and colored characters and marks of different color from said predetermined color.

33. A television receiver as claimed in claim 32 wherein said colored characters and marks of predetermined color indicate items available for selection, and said colored characters and marks of different color from said predetermined color indicate items not available for selection.

34. A television receiver as claimed in claim 32, wherein said colored characters and marks of predetermined color indicate performed items, and said colored characters and marks of different color from said predetermined color indicate unperformed items.

* * * * *